(12) United States Patent
Kinomura

(10) Patent No.: US 11,027,621 B2
(45) Date of Patent: Jun. 8, 2021

(54) VEHICLE AND CHARGING SYSTEM

(71) Applicant: TOYOTA JIDOSHA KABUSHIKI KAISHA, Toyota (JP)

(72) Inventor: Shigeki Kinomura, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 257 days.

(21) Appl. No.: 16/370,863

(22) Filed: Mar. 29, 2019

(65) Prior Publication Data

US 2019/0322185 A1 Oct. 24, 2019

(30) Foreign Application Priority Data

Apr. 20, 2018 (JP) .............................. JP2018-081333

(51) Int. Cl.
*B60L 53/16* (2019.01)
*B60L 53/62* (2019.01)
*H01M 10/44* (2006.01)
*H01R 13/66* (2006.01)
*H02J 7/00* (2006.01)
*B60L 53/30* (2019.01)

(52) U.S. Cl.
CPC ............. *B60L 53/16* (2019.02); *B60L 53/305* (2019.02); *B60L 53/62* (2019.02); *H01M 10/443* (2013.01); *H01R 13/6683* (2013.01); *H02J 7/007* (2013.01)

(58) Field of Classification Search
CPC .......... B60L 53/00; B60L 53/16; B60L 53/62; B60L 53/305; H01M 10/443; H01R 13/6683; H02J 7/007; Y04S 30/14; Y02T 90/12; Y02T 90/14
USPC ........................................................ 320/109
See application file for complete search history.

(56) References Cited

U.S. PATENT DOCUMENTS

2019/0308519 A1* 10/2019 Tsukamoto ............. B60L 53/16

FOREIGN PATENT DOCUMENTS

JP 2012-161241 A 8/2012

* cited by examiner

*Primary Examiner* — Paul Dinh
(74) *Attorney, Agent, or Firm* — Oliff PLC

(57) ABSTRACT

An ECU performs a first process of transmitting first information to a server, and performs a second process by acquiring second information from the server. The first information includes temperature information about a temperature of an inlet during external charging, and information for identifying a charging station connected to the inlet. The second process includes a process of controlling the external charging based on the second information acquired before a start of the external charging. The second information includes abnormal overheat information about the charging station connected to the inlet. The occurrence of abnormal overheat is determined based on the temperature of the inlet during the external charging.

10 Claims, 12 Drawing Sheets

FIG.6

<CHARGING ST INFORMATION>

| ID | LOCATION INFORMATION | ABNORMAL OVERHEAT |
|---|---|---|
| ST001 | P1 | — |
| ST002 | P2 | ○ |
| ST003 | P3 | — |
| ... | ... | ... |
| ... | ... | ... |

FIG.7

<VEHICLE INFORMATION>

| ID | CHARGING ST | TEMPERATURE INFORMATION |
|---|---|---|
| V001 | ST001 | T1 |
| | ST002 | T2 |
| | ... | ... |
| V002 | ST001 | T3 |
| | ST003 | T4 |
| | ... | ... |
| ... | ... | ... |
| ... | ... | ... |

FIG.11

<CHARGING ST INFORMATION>

| ID | LOCATION INFORMATION | NUMBER OF OVERHEAT | ABNORMAL OVERHEAT |
|---|---|---|---|
| ST001 | P1 | 0/N1 | — |
| ST002 | P2 | 3/N2 | ○ |
| ST003 | P3 | 1/N3 | — |
| ... | ... | ... | ... |
| ... | ... | ... | ... |

FIG.12

<VEHICLE INFORMATION>

| ID | CHARGING ST | TEMPERATURE INFORMATION | OVERHEAT HISTORY | NUMBER OF OVERHEAT | VEHICLE ABNORMALITY |
|---|---|---|---|---|---|
| V001 | ST001 | T1 | — | 1/N11 | — |
| | ST002 | T2 | ○ | | |
| | ST003 | T3 | — | | |
| | ... | ... | ... | | |
| V002 | ST001 | T4 | — | 1/N12 | — |
| | ST002 | T5 | ○ | | |
| | ST003 | T6 | — | | |
| | ... | ... | ... | | |
| V003 | ST003 | T7 | ○ | 3/N13 | ○ |
| | ST005 | T8 | ○ | | |
| | ST006 | T9 | ○ | | |
| | ... | ... | ... | | |
| ... | ... | ... | ... | ... | ... |
| ... | ... | ... | ... | ... | ... |

VEHICLE AND CHARGING SYSTEM

This nonprovisional application is based on Japanese Patent Application No. 2018-081333 filed on Apr. 20, 2018 with the Japan Patent Office, the entire contents of which are hereby incorporated by reference.

BACKGROUND

Field

The present disclosure relates to vehicles and charging systems, and more particularly to a vehicle and a charging system capable of performing external charging in which a vehicle-mounted power storage device is charged by a charging facility provided outside of the vehicle.

Description of the Background Art

Japanese Patent Laying-Open No. 2012-161241 discloses a power feeding system capable of charging a vehicle-mounted battery through a charging cable from a power feeding station (charging facility). This power feeding system includes a power feeding station, a terminal machine used by a user of this power feeding station, and a server that communicates with the power feeding station and the terminal machine through a communication network. The state of progress of the charging of the vehicle-mounted battery by the power feeding station is calculated in the server, and a result of the calculation is transmitted from the server to the terminal machine. In this manner, according to this power feeding system, the user can be notified of the state of progress of the charging by the server.

When degradation or breakage of a terminal occurs at an electrical contact portion between a vehicle and a charging facility, abnormal overheat may occur at the contact portion during external charging. Particularly in public charging facilities used by a large number of unspecified users (vehicles), where it is assumed that adequate maintenance is not always provided, the abnormal overheat at the contact portion may cause trouble. Such a situation is not particularly considered in the power feeding system described in Japanese Patent Laying-Open No. 2012-161241.

SUMMARY

The present disclosure has been made to solve the problem as described above, and has an object to address, in a vehicle configured to perform external charging, abnormal overheat at an electrical contact portion with a charging facility.

A vehicle in the present disclosure is a vehicle configured to perform external charging in which a vehicle-mounted power storage device is charged by a charging facility provided outside of the vehicle, the vehicle including a power receiving inlet, a communication device, and controller. The power receiving inlet is connectable to a connector of the charging facility during the external charging. The communication device is configured to communicate with a server provided outside of the vehicle. The controller is configured to perform a first process of transmitting first information to the server through the communication device. The controller is also configured to perform a second process by acquiring second information from the server through the communication device. The first information includes temperature information about a temperature of the power receiving inlet during the external charging, and information for identifying the charging facility having the connector connected to the power receiving inlet. The second process includes a process of controlling the external charging based on the second information acquired before a start of the external charging. The second information includes abnormal overheat information about the charging facility connected to the power receiving inlet, the abnormal overheat information indicating a history of abnormal overheat at the power receiving inlet connected to the connector during past external charging. Occurrence of the abnormal overheat is determined based on the temperature of the power receiving inlet during the external charging.

A charging system in the present disclosure includes a plurality of vehicles and a server. Each vehicle is configured to perform external charging in which a vehicle-mounted power storage device is charged by a charging facility provided outside of the vehicle. The server is configured to communicate with the plurality of vehicles. Each vehicle includes a power receiving inlet, a communication device, and a controller. The power receiving inlet is connectable to a connector of the charging facility during the external charging. The communication device is configured to communicate with the server provided outside of the vehicle. The controller is configured to perform a first process of transmitting first information to the server through the communication device. The controller is also configured to perform a second process by acquiring second information from the server through the communication device. The first information includes temperature information about a temperature of the power receiving inlet during the external charging, and information for identifying the charging facility having the connector connected to the power receiving inlet. The second process includes a process of controlling the external charging based on the second information acquired before a start of the external charging. The second information includes abnormal overheat information about the charging facility connected to the power receiving inlet, the abnormal overheat information indicating a history of abnormal overheat at the power receiving inlet connected to the connector during past external charging. Occurrence of the abnormal overheat is determined based on the temperature of the power receiving inlet during the external charging.

In the vehicle and the charging system described above, when the external charging is performed, the first information including the temperature information about the temperature of the power receiving inlet and the information for identifying the charging facility is collected at the server. Accordingly, the server can determine whether or not abnormal overheat has occurred during the external charging at which charging station. In addition, in these vehicle and charging system, the second information including the abnormal overheat information about the charging facility connected to the power receiving inlet is acquired from the server, before the start of the external charging, and the external charging is controlled based on the second information. Accordingly, when there is a history of abnormal overheat in this charging facility, measures can be taken such as performing the external charging with a suppressed charging current, or stopping the external charging.

The second process may include a process of starting, when the abnormal overheat information indicates that there is a history of the abnormal overheat, the external charging with a suppressed charging current, as compared to when the abnormal overheat information indicates that there is no history of the abnormal overheat.

Accordingly, when an abnormality (such as degradation or breakage) has actually occurred in the connector of the charging facility, melting damage to the power receiving inlet and/or the connector due to a large charging current flowing at the start of the external charging can be avoided.

The second process may further include a process of increasing, when the abnormal overheat at the power receiving inlet does not occur after the external charging is started with the suppressed charging current, the charging current more than that at the start of the external charging.

When the abnormal overheat information indicates that there is a history of abnormal overheat, the indication of there being a history of abnormal overheat may be caused by the occurrence of an abnormality (such as degradation or breakage) in the power receiving inlet of the vehicle, not by the occurrence of an abnormality in the connector of the charging facility. In these vehicle and charging system, therefore, when abnormal overheat (for example, a sudden temperature increase) does not occur after the external charging is started with the suppressed charging current, it is determined that the connector of the charging facility is normal, and the charging current is increased. Accordingly, extension of charging time due to an unnecessarily suppressed charging current can be avoided.

The controller may be configured to determine occurrence of the abnormal overheat based on the temperature of the power receiving inlet during the external charging. The temperature information may include information of the abnormal overheat.

In this configuration, the occurrence of abnormal overheat is determined in the vehicle, and a result of the determination is transmitted to the server. Accordingly, a process of determining the occurrence of abnormal overheat does not need to be provided in the server, so that a processing load on the server can be suppressed.

The server may be configured to generate the abnormal overheat information based on the first information collected from the plurality of vehicles, and when the abnormal overheat has occurred for different vehicles of the plurality of vehicles, cause the abnormal overheat information about the charging facility connected to the power receiving inlet to indicate that there is a history of the abnormal overheat.

It cannot be inherently determined, merely from a single occurrence of abnormal overheat, whether an abnormality has occurred in the connector of the charging facility or an abnormality has occurred in the power receiving inlet of the vehicle. According to the configuration described above, it can be determined that an abnormality has occurred in the charging facility.

The temperature information may include the temperature of the power receiving inlet during the external charging. The server may be configured to determine occurrence of the abnormal overheat based on the temperature information.

In this configuration, the occurrence of abnormal overheat is determined in the server. Accordingly, a process of determining the occurrence of abnormal overheat does not need to be provided in the vehicle, so that a processing load on the vehicle can be suppressed.

The foregoing and other objects, features, aspects and advantages of the present disclosure will become more apparent from the following detailed description of the present disclosure when taken in conjunction with the accompanying drawings.

BRIEF DESCRIPTION OF THE DRAWINGS

FIG. 6 shows a configuration example of data stored in a charging station information DB of the server.

FIG. 7 shows a configuration example of data stored in a vehicle information DB of the server.

FIG. 11 shows a configuration example of data stored in the charging station information DB of the server in the second embodiment.

FIG. 12 shows a configuration example of data stored in the vehicle information DB of the server in the second embodiment.

DESCRIPTION OF THE PREFERRED EMBODIMENTS

Figure 1:
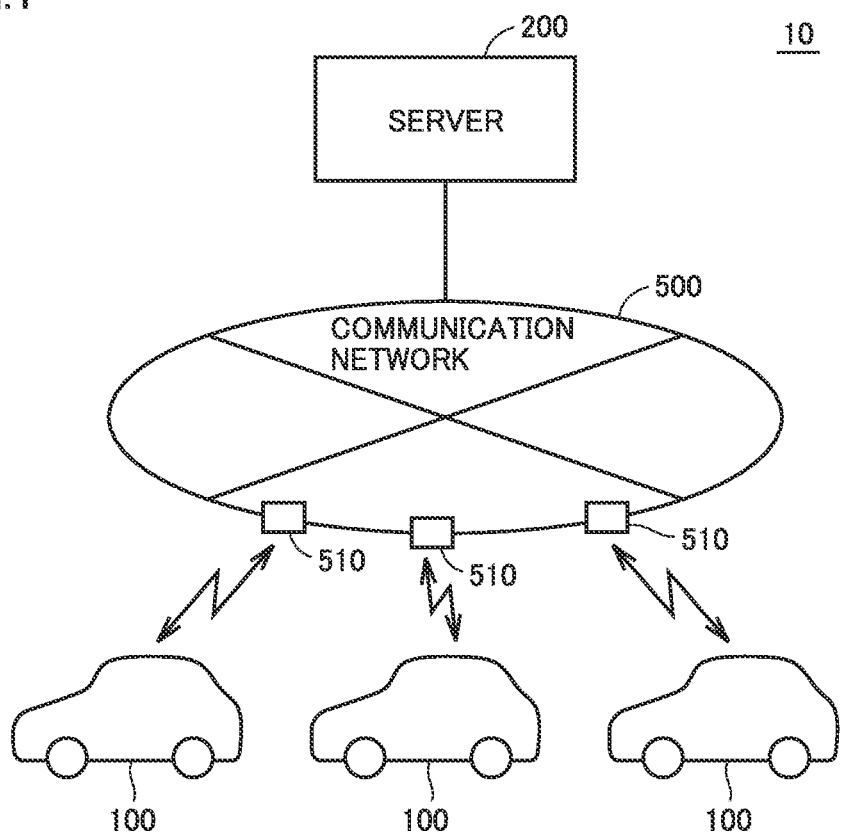
FIG. 1 shows an overall configuration of a charging system configured to include vehicles according to a first embodiment.

Embodiments of the present disclosure will be described below in detail with reference to the drawings. The same or corresponding parts are designated by the same characters in the drawings and description thereof will not be repeated.

First Embodiment

<System Configuration>

FIG. 1 shows an overall configuration of a charging system configured to include vehicles according to a first embodiment. Referring to FIG. 1, this charging system 10 includes a plurality of vehicles 100, a server 200, and a communication network 500. Each vehicle 100 is configured to communicate with server 200 through communication network 500 such as the Internet or a telephone line. Each vehicle 100 is configured to wirelessly communicate with a base station 510 of communication network 500.

Each vehicle 100 is an electrically powered vehicle which is equipped with a power storage device storing electric power for travel, and which is capable of generating driving force for travel using the electric power stored in the power storage device. It should be noted that one vehicle 100 will be representatively described below.

Vehicle 100 is further configured such that the power storage device can be charged through a charging cable from a charging facility (not shown) provided outside of the vehicle. That is, vehicle 100 is a so-called "plug-in vehicle," which can be externally charged with a contact charging method. The configuration of vehicle 100 will be described in detail later.

Server 200 communicates with vehicle 100 through communication network 500, and sends and receives various types of information to and from vehicle 100. Server 200 collects information during external charging from each vehicle 100, and stores information about charging facilities and each vehicle 100. Then, when external charging of vehicle 100 is to be performed, server 200 transmits information about the charging facility to vehicle 100 in response to a request from vehicle 100. The configuration and operation of server 200 will be described in detail later.

Figure 2:
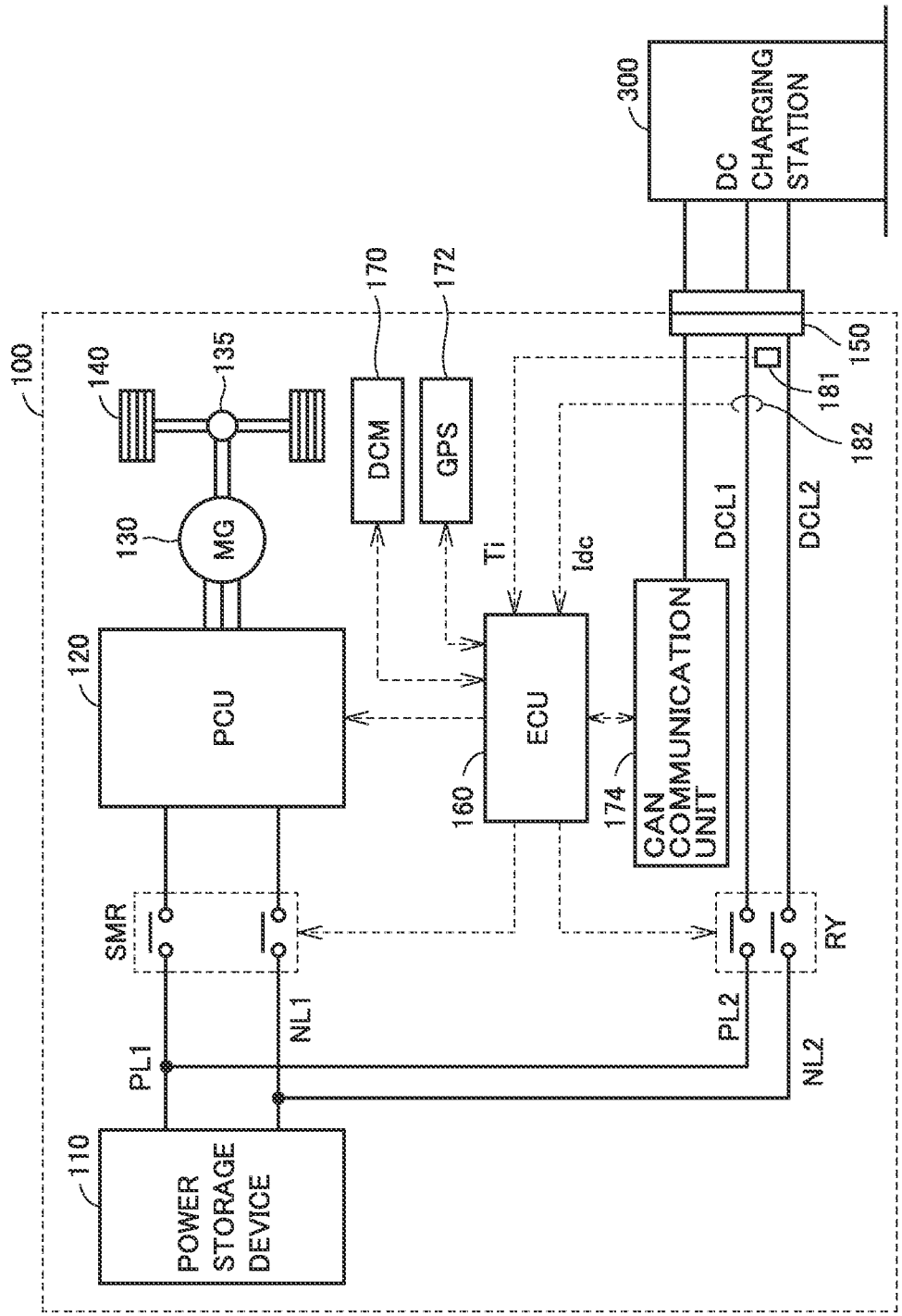
FIG. 2 shows an example configuration of each vehicle.

FIG. 2 shows an example configuration of vehicle 100. Although vehicle 100 is described below as an electric vehicle not equipped with an engine, vehicle 100 may be a hybrid vehicle equipped with an engine, or a fuel cell vehicle quipped with a fuel cell.

Referring to FIG. 2, vehicle 100 includes a power storage device 110, a system main relay SMR, a power control unit (hereinafter referred to as "PCU") 120, a motor generator (hereinafter referred to as "MG") 130, a drive-train gear 135, a driving wheel 140, an inlet 150, and a charging relay RY. Vehicle 100 further includes an ECU (Electronic Control Unit) 160, a DCM (Data Communication Module) 170, a GPS (Global Positioning System) receiver 172, a CAN (Controller Area Network) communication unit 174, a temperature sensor 181, and a current sensor 182.

Power storage device 110 is an electric power storage component configured to be chargeable/dischargeable. Power storage device 110 is configured to include a secondary battery such as a lithium ion battery or a nickel-metal hydride battery, or include a power storage element such as an electric double layer capacitor, for example. The lithium ion secondary battery is a secondary battery with lithium serving as a charge carrier, and may include a common lithium ion secondary battery using a liquid electrolyte, and also a so-called all-solid battery using a solid electrolyte.

Power storage device 110 is charged by a charging station 300 outside of the vehicle which is connected to inlet 150 through a charging cable (external charging). Power storage device 110 then supplies electric power to MG 130 through PCU 120 during travel. Power storage device 110 is also charged by receiving electric power generated by MG 130 through PCU 120 while MG 130 regenerates electric power during braking of the vehicle.

System main relay SMR is provided between a pair of power lines PL1, NL1 connected to power storage device 110 and PCU 120, and is turned on by ECU 160 when a vehicle system is activated by a start switch or the like not shown in the figure.

PCU 120 is a driving device for driving MG 130, and is configured to include a power conversion device such as a converter or an inverter. PCU 120 is controlled by ECU 160, and converts DC power received from power storage device 110 into AC power for driving MG 130. PCU 120 also converts AC power generated by MG 130 into DC power, and outputs the DC power to power storage device 110.

MG 130 is typically an AC rotating electrical machine, such as a three-phase AC synchronous motor including a rotor having a permanent magnet embedded therein. MG 130 is driven by PCU 120 to generate rotational driving force, and the driving force generated by MG 130 is transmitted to driving wheel 140 through drive-train gear 135. During braking or suppression of acceleration on a downslope by the vehicle, on the other hand, MG 130 operates as a generator and regenerates electric power. The electric power generated by MG 130 is supplied to power storage device 110 through PCU 120.

Charging relay RY is provided between a pair of power lines DCL1, DCL2 connected to inlet 150, and a pair of power lines PL2, NL2 connected to the pair of power lines PL1, NL1, and is turned on by ECU 160 during execution of external charging.

Inlet 150 receives charging power supplied from charging station 300 during external charging. During external charging, a connector of charging station 300 is connected to inlet 150, and DC power output from charging station 300 is supplied through inlet 150, the pair of power lines DCL1, DCL2, charging relay RY, the pair of power lines PL2, NL2, and the pair of power lines PL1, NL1, to power storage device 110.

DCM 170 is a communication module for conducting communication with server 200 (FIG. 1), and is configured to allow bidirectional data communication between vehicle 100 (ECU 160) and server 200 through communication network 500 (FIG. 1).

GPS receiver 172 identifies the present location based on electric waves from artificial satellites, and outputs the identified location information to ECU 160. The location information identified by GPS receiver 172 can be utilized in a navigation device (not shown) and the like. Furthermore, in this first embodiment, the location information identified by GPS receiver 172 is used to identify charging station 300 during external charging (described later).

CAN communication unit 174 is configured to conduct CAN communication between vehicle 100 (ECU 160) and charging station 300 during external charging. This first embodiment illustrates an example in which DC (Direct Current) charging is performed in accordance with the CHAdeMO (registered trademark) standard. The communication between vehicle 100 and charging station 300 is also conducted in accordance with a CAN communication protocol adopted by CHAdeMO.

It should be noted that a charging method that can be adopted by vehicle 100 according to the present disclosure is not limited to the CHAdeMO method. For example, the Combo (Combined Charging System) method which has been standardized mainly by Europe and the United States can also be adopted. The communication between vehicle 100 and charging station 300 is not limited to the CAN communication adopted by the CHAdeMO method, either, but may be conducted through power line communication (PLC) adopted by the Combo method, or through wireless communication.

During travel of the vehicle, ECU 160 turns on system main relay SMR and controls PCU 120, to control driving of MG 130 and charging and discharging of power storage device 110. During external charging, ECU 160 turns on charging relay RY and transmits a charging start request, a charging current command value and the like to charging station 300 through CAN communication unit 174, to perform external charging. ECU 160 also calculates an SOC (State Of Charge) of power storage device 110, and when the SOC reaches a prescribed upper limit value, transmits a charging stop request to charging station 300 through CAN communication unit 174 and turns off charging relay RY. As a method of calculating the SOC, various known methods can be used such as a method using an OCV (Open Circuit Voltage)-SOC curve (such as a map) indicating relation between the OCV and the SOC, or a method using an integrated value of charging and discharging currents.

Temperature sensor 181 detects a temperature Ti of inlet 150, and outputs the detected value to ECU 160. Temperature sensor 181 is provided, for example, on the back side of a terminal of inlet 150 with an insulation coating interposed therebetween. Temperature sensor 181 may be of contact type such as a thermocouple or a thermistor, or may be of non-contact type such as a radiation thermometer. Current sensor 182 detects a charging current Idc supplied from charging station 300 during external charging, and outputs the detected value to ECU 160.

Charging station 300 is a charging facility for supplying electric power to vehicle 100. Charging station 300 is a public charging station, such as a quick charging station capable of supplying DC power of from several tens of kW to several hundreds of kW. A charging cable of charging station 300 is provided with a connector connectable to inlet 150 of vehicle 100. While the connector is being connected to inlet 150, DC power can be supplied from charging station 300 to vehicle 100, and CAN communication can be conducted between charging station 300 and vehicle 100.

Data transmitted from vehicle 100 to charging station 300 while the connector of charging station 300 is being connected to inlet 150 includes, for example, a charging start request, a charging stop request, a charging current command value, and a charging voltage upper limit value. Data transmitted from charging station 300 to vehicle 100 includes, for example, maximum output information (a possible output current value, a possible output voltage value and the like), and present output information (a present output current value, a present output voltage value and the like).

Figure 3:
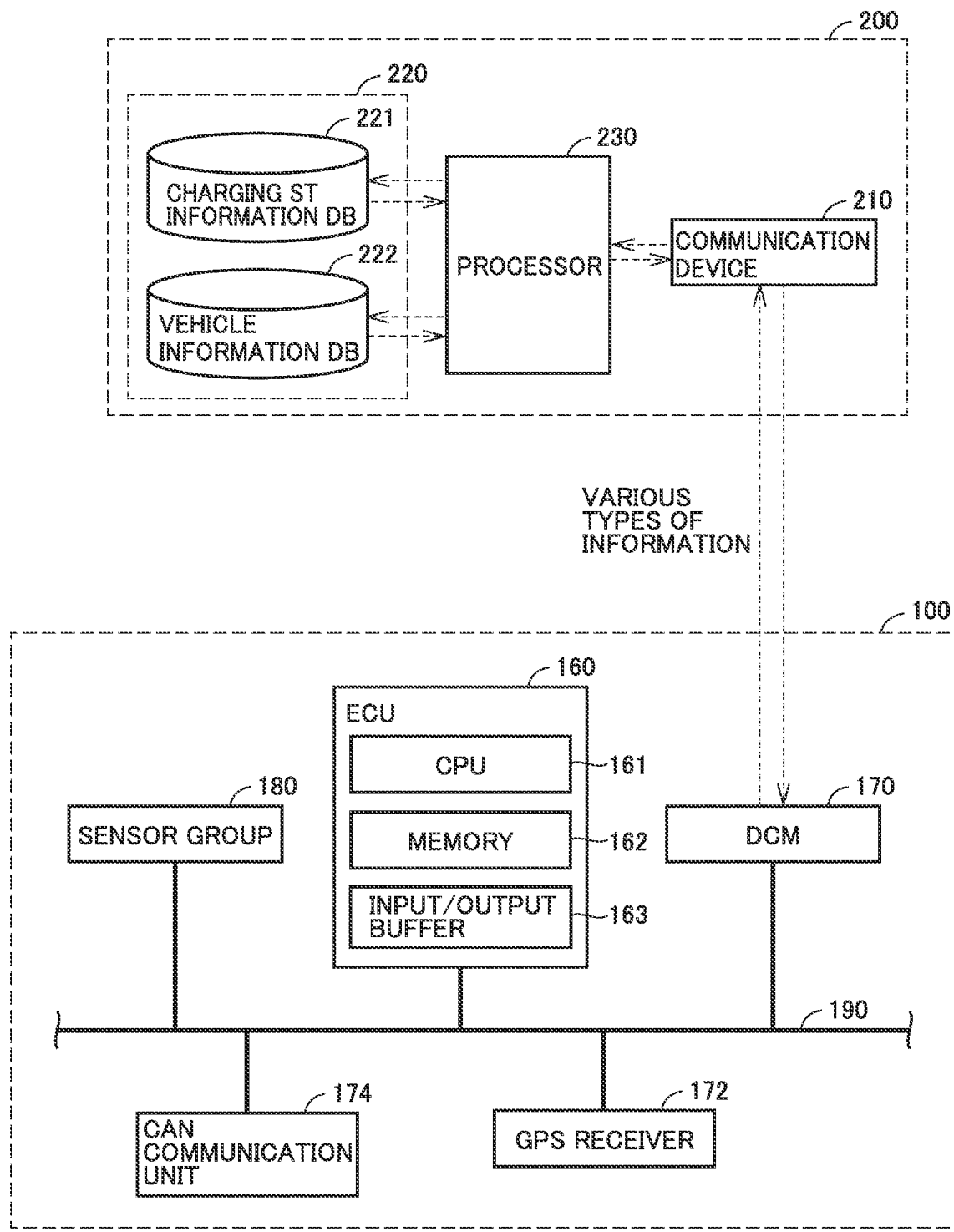
FIG. 3 shows in detail the configurations of an ECU and its peripheral devices of the vehicle, and of a server.

FIG. 3 shows in detail the configurations of ECU 160 and its peripheral devices of vehicle 100, and of server 200. Referring to FIG. 3, ECU 160 of vehicle 100 is configured to include a CPU (Central Processing Unit) 161, a memory (a ROM (Read Only Memory) and a RAM (Random Access Memory)) 162, and an input/output buffer 163. CPU 161 develops and executes a program, stored in the ROM, on the RAM or the like. The program stored in the ROM describes a process of ECU 160.

ECU 160, DCM 170, a sensor group 180 (which includes temperature sensor 181 and current sensor 182), GPS receiver 172, and CAN communication unit 174 are connected to an in-vehicle network 190. ECU 160 can conduct CAN communication with each device through in-vehicle network 190.

When the connector of charging station 300 is connected to inlet 150 (FIG. 2), ECU 160 exchanges various types of information with charging station 300 through CAN communication unit 174, and performs external charging. ECU 160 also acquires location information from GPS receiver 172, and acquires a detected value from each sensor of sensor group 180. Moreover, ECU 160 exchanges various types of information with server 200 through DCM 170 and communication network 500 (FIG. 1).

Server 200 includes a communication device 210, a storage device 220, and a processor 230. Communication device 210 is configured to communicate with DCM 170 of vehicle 100 through communication network 500.

Storage device 220 includes a charging station information database (DB) 221 and a vehicle information database (DB) 222. Charging station information DB 221 stores information about each charging station available for external charging of vehicle 100. That is, vehicle 100 can also be externally charged from other charging stations having a similar configuration to that of charging station 300, and charging station information DB 221 stores information about each such charging station.

Vehicle information DB 222 stores information about each vehicle 100. Vehicle 100 can utilize charging system 10 through a registration procedure, and vehicle information DB 222 stores information about each vehicle 100 thus registered. A data configuration of each of charging station information DB 221 and vehicle information DB 222 will be described later.

Processor 230 is configured to include a CPU, a memory (a ROM and a RAM), and an input/output buffer (not shown). When external charging is performed in vehicle 100, information associated with that external charging (temperature information about inlet 150, location information for identifying charging station 300, and the like (the details of which will be described later)) is transmitted from vehicle 100 to server 200. When processor 230 receives the information associated with the external charging from vehicle 100, processor 230 stores the received information in charging station information DB 221 and vehicle information DB 222.

In addition, when the connector of charging station 300 is connected to inlet 150, vehicle 100 acquires information about charging station 300 from server 200, before the start of execution of external charging. On this occasion, processor 230 acquires this information about charging station 300 from charging station information DB 221 and transmits the information to vehicle 100. The process of each of ECU 160 (vehicle 100) and server 200 associated with external charging is described in detail below.

<Description of Processes of ECU 160 and Server 200 Associated with External Charging>

When degradation or breakage of a terminal has occurred at an electrical contact portion between inlet 150 of vehicle 100 and the connector of charging station 300, abnormal overheat may occur at the contact portion during external charging due to increased contact resistance, causing trouble.

In this first embodiment, therefore, when external charging is performed in each vehicle 100, temperature information about the temperature of inlet 150 during the external charging is transmitted to server 200. Information for identifying vehicle 100 and charging station 300 is also transmitted, along with this temperature information, to server 200.

Server 200 which has received each information from vehicle 100 determines, based on the temperature information about inlet 150, whether or not abnormal overheat has occurred during the external charging, and when it is determined that abnormal overheat has occurred, server 200 stores the fact that abnormal overheat has occurred during the external charging by this charging station 300, as abnormal overheat information, in charging station information DB 221.

Then, in vehicle 100 according to this first embodiment, the abnormal overheat information about charging station 300 connected to inlet 150 is acquired from server 200, before the execution of external charging, and the external charging is controlled based on that abnormal overheat information. Specifically, in this first embodiment, when the abnormal overheat information indicates that there is a history of abnormal overheat, external charging is started with a charging current suppressed so as to avoid melting damage to inlet 150 and the connector of charging station 300, and the occurrence of abnormal overheat at inlet 150 is monitored. The occurrence of abnormal overheat is determined based on, for example, an increase rate of the temperature of inlet 150 or a reached temperature of inlet 150.

Then, when abnormal overheat does not occur after the external charging is started with the suppressed charging current, the external charging is subsequently performed with a maximum charging current (target charging current). When abnormal overheat has occurred during past external charging using this charging station 300 due to an abnormality in a vehicle connected to charging station 300, then it is considered that abnormal overheat will not occur during this external charging if there is no abnormality in this vehicle 100. When abnormal overheat occurs after the external charging is started with the suppressed charging current, on the other hand, the external charging is stopped. Accordingly, melting damage to inlet 150 and/or the connector due to a large charging current flowing at the start of the external charging can be avoided.

Figure 4:
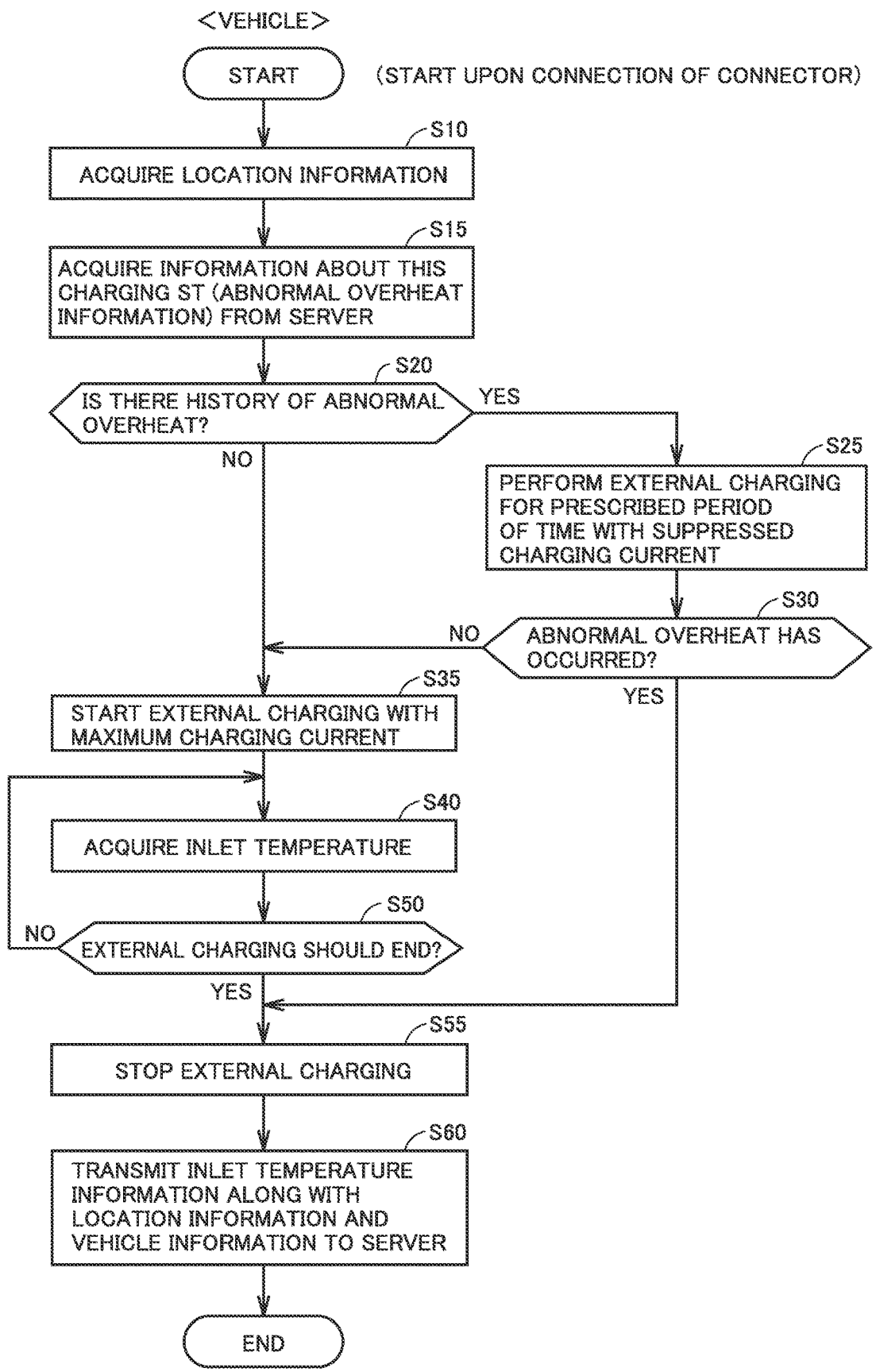
FIG. 4 is a flowchart showing an example procedure of a process performed by the ECU of the vehicle during external charging.

FIG. 4 is a flowchart showing an example procedure of a process performed by ECU 160 of vehicle 100 during external charging. A series of process steps shown in this flowchart is started when, for example, the connector of charging station 300 is connected to inlet 150.

Referring to FIG. 4, ECU 160 first acquires location information from GPS receiver 172 (step S10). This location information is transmitted to server 200, and used to identify charging station 300 in server 200. If ID information unique to charging station 300 connected to inlet 150 can be acquired from charging station 300 through CAN communication, the ID information about charging station 300 may be acquired from charging station 300, instead of the location information.

Then, ECU 160 transmits the acquired location information to server 200, and acquires, from server 200, information about charging station 300 identified based on that location information in server 200 (step S15). This acquired information about charging station 300 includes the abnormal overheat information about this charging station 300.

If ID information about charging station 300 can be acquired from charging station 300, the acquired ID information may be transmitted to server 200, and information about charging station 300 identified based on that ID information may be acquired from server 200.

When the information about charging station 300 (abnormal overheat information) is acquired from server 200, ECU 160 determines, based on the acquired abnormal overheat information, whether or not there is a history of abnormal overheat in charging station 300 connected to inlet 150 (step S20).

When it is determined that there is no history of abnormal overheat (NO in step S20), ECU 160 starts external charging with a maximum charging current (target charging current) (step S35). Specifically, ECU 160 transmits a charging current command value of the maximum charging current (target charging current) and a charging start request to charging station 300 through CAN communication unit 174.

When it is determined in step S20 that that there is a history of abnormal overheat (YES in step S20), on the other hand, ECU 160 performs external charging for a prescribed period of time with a charging current suppressed so as to avoid melting damage to inlet 150 and the connector of charging station 300 (step S25). Specifically, ECU 160 transmits a prescribed charging current command value lower than the maximum charging current (target charging current) and a charging start request to charging station 300 through CAN communication unit 174. The prescribed period of time is set, for example, to a period of time over which the temperature of inlet 150, which increases due to the flow of the charging current described above, can return to normal.

Then, ECU 160 determines, based on the temperature of inlet 150, whether or not abnormal overheat has occurred (step S30). Whether or not abnormal overheat has occurred can be determined based on an increase rate of the temperature, or whether or not a reached temperature exceeds a threshold value. When abnormal overheat has not occurred (NO in step S30), ECU 160 proceeds the process to step S35, and the external charging is subsequently performed with the maximum charging current (target charging current).

When it is determined in step S30 that abnormal overheat has occurred (YES in step S30), on the other hand, ECU 160 stops the external charging (step S55). Specifically, ECU 160 transmits a charging current command value of zero and a charging stop request to charging station 300. Then, ECU 160 proceeds the process to step S60 (described later).

When the external charging is started with the maximum charging current in step S35, ECU 160 acquires the temperature of inlet 150 (step S40). Then, ECU 160 determines whether or not the external charging should end (step S50). It is determined that the external charging should end when the SOC of power storage device 110 reaches a prescribed upper limit, or when the end of the external charging is requested by a user. When the external charging should not end (NO in step S50), the process returns to step S40 and the external charging is continued. Then, the temperature of inlet 150 is acquired in step S40 during the execution of the external charging.

When it is determined in step S50 that the external charging should end (YES in step S50), ECU 160 proceeds the process to step S55, where the external charging is stopped. When the external charging is stopped in step S55, ECU 160 transmits, to server 200, the temperature information about inlet 150 during the external charging, along with the location information acquired from GPS receiver 172 and the vehicle information (step S60).

The temperature information may be, for example, a time-series variation in temperature, a maximum temperature, or a maximum value of temperature increase rate. This temperature information is used to determine the occurrence of abnormal overheat in server 200. The location information acquired from GPS receiver 172 is used as information for identifying charging station 300 in server 200, and the vehicle information is used as information for identifying this vehicle 100 in server 200.

Although the temperature information is transmitted to server 200 after the end of the external charging in the above description, the temperature of inlet 150 may be transmitted to server 200 at regular intervals during the execution of the external charging. In addition, the timing of the transmission of the location information and the vehicle information to server 200 is not limited to after the end of the external charging, but may be during the execution of the external charging. Since the location information is transmitted to server 200 in order to acquire the information about charging station 300 from server 200 in step S15, the transmission of the location information at this stage may be omitted.

Figure 5:
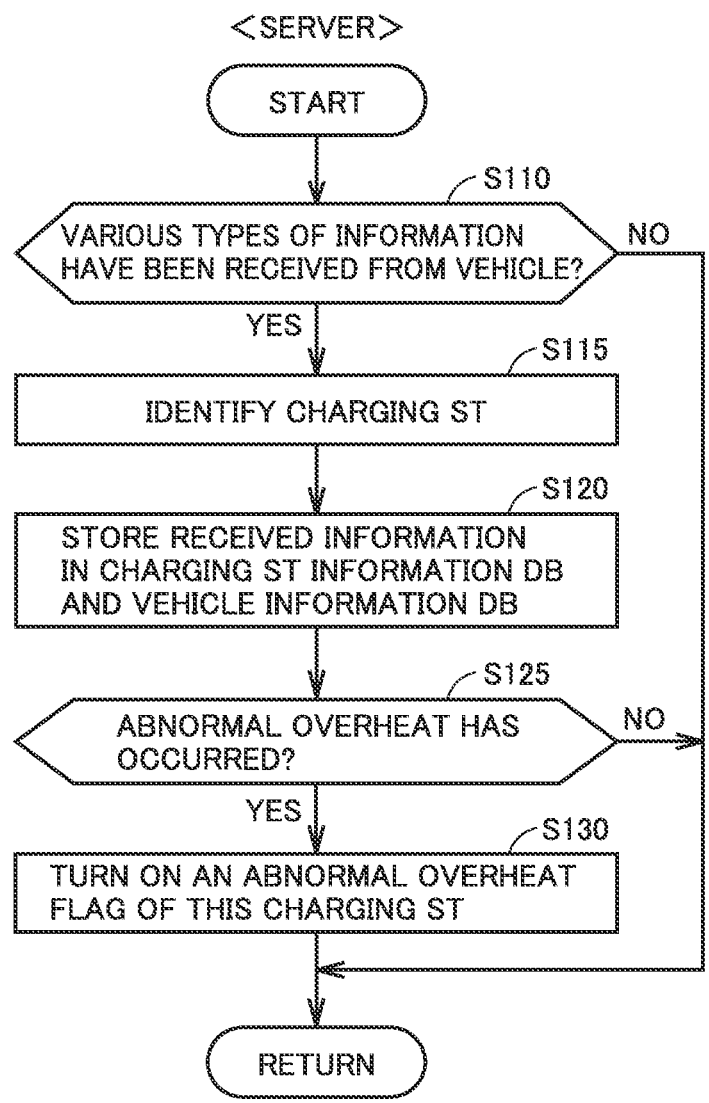
FIG. 5 is a flowchart showing an example procedure of a process performed by a processor of the server.

FIG. 5 is a flowchart showing an example procedure of a process performed by processor 230 of server 200. A series of process steps shown in this flowchart is repeated at regular intervals.

Referring to FIG. 5, processor 230 of server 200 determines whether or not various types of information have been received from each vehicle 100 (step S110). The various types of information are information transmitted from vehicle 100 to server 200 in step S60 of FIG. 4 as a result of the external charging, which are the temperature information about inlet 150 during the external charging, the location information, and the vehicle information about the source vehicle.

Next, processor 230 identifies, based on the received location information, a charging station that was used for external charging (step S115). Although the location information received from vehicle 100 indicates the present location of vehicle 100, during external charging, the location of vehicle 100 is regarded as the location of charging station 300, and charging station 300 is identified from that location information. If ID information about charging station 300 is transmitted from vehicle 100, a charging station is identified based on that ID information.

Then, processor 230 stores the received information in charging station information DB 221 and vehicle information DB 222 (step S120). Specifically, the location information is stored in charging station information DB 221 while being associated with information about the identified charging station, and the temperature information about inlet 150 is stored in vehicle information DB 222 while being associated with information about a vehicle identified from the vehicle information.

Subsequently, processor 230 determines, based on the received temperature information, whether or not abnormal overheat has occurred in vehicle 100 from which this temperature information was acquired (step S125). Whether or not abnormal overheat has occurred is determined based on, for example, an increase rate of the temperature, or whether or not the maximum temperature exceeds a threshold value.

When it is determined that abnormal overheat has occurred (YES in step S125), processor 230 turns on an abnormal overheat flag indicating a history of abnormal overheat in this charging station (step S130). The abnormal overheat flag is stored in charging station information DB 221 while being associated with information about this charging station. This abnormal overheat flag corresponds to the abnormal overheat information about this charging station, and the abnormal overheat information acquired by vehicle 100 in step S15 of FIG. 4 is based on this abnormal overheat flag.

When it is determined in step S125 that abnormal overheat has not occurred (NO in step S125), the process proceeds to a return step without step S130 being performed. In this case, the abnormal overheat flag of this charging station is not updated. That is, once the abnormal overheat flag is turned on, the flag is not turned off even when it is determined in step S125 that abnormal overheat has not occurred.

FIG. 6 shows a configuration example of data stored in charging station information DB 221 of server 200. Referring to FIG. 6, "ID" is identification information for identifying a charging station. A unique ID is assigned to each charging station registered. "LOCATION INFORMATION" indicates the location of a charging station. In step S115 of FIG. 5, charging station information DB 221 is referred to, and a charging station is identified based on the received location information.

"ABNORMAL OVERHEAT" is the abnormal overheat information about a charging station, where the circle indicates that the abnormal overheat flag is ON. The abnormal overheat flag that has been turned on remains in an ON state until maintenance of its corresponding charging station is performed and the flag is intentionally turned off by an operator. That is, this abnormal overheat flag indicates a history of abnormal overheat until the next maintenance is performed at its corresponding charging station. In step S15 of FIG. 4, the abnormal overheat information about the charging station identified based on the location information is acquired from this charging station information DB 221.

FIG. 7 shows a configuration example of data stored in vehicle information DB 222 of server 200. Referring to FIG. 7, "ID" is identification information for identifying vehicle 100. A unique ID is assigned to each vehicle 100 registered. "CHARGING ST" indicates the ID of a charging station that was used for external charging. As an example, it is indicated that, with regard to vehicle 100 having an ID of V001, external charging was performed in the past by charging stations having IDs of ST001 and ST002.

"TEMPERATURE INFORMATION" is temperature information about inlet 150 collected from each vehicle 100 as a result of external charging. As an example, it is indicated that, with regard to vehicle 100 having an ID of V001, the temperature information about inlet 150 collected when external charging was performed by the charging station having an ID of ST001 has been stored as "T1." If external charging was performed a plurality of times by the same charging station, temperature information corresponding to the plurality of times is stored.

As described above, in this first embodiment, when external charging is performed, the temperature information about the temperature of inlet 150, and the location information serving as information for identifying charging station 300 are collected at server 200. Accordingly, server 200 can determine whether or not abnormal overheat has occurred during the external charging at which charging station.

In addition, in this first embodiment, the abnormal overheat information about charging station 300 connected to inlet 150 is acquired from server 200, before the start of external charging, and the external charging is controlled based on this abnormal overheat information. Specifically, when the abnormal overheat information indicates that there is a history of abnormal overheat, the external charging is started with a suppressed charging current. Accordingly, when an abnormality (such as degradation or breakage of the connector) has actually occurred in charging station 300, melting damage to inlet 150 and/or the connector of charging station 300 due to a large charging current flowing at the start of the external charging can be avoided.

Moreover, in this first embodiment, when abnormal overheat does not occur after the external charging is started with the suppressed charging current, the charging current is increased. That is, although the abnormal overheat information about this charging station 300 indicates that there is a history of abnormal overheat, if this abnormal overheat has occurred due to an abnormality in the vehicle, and abnormal overheat does not occur in the external charging with the suppressed charging current, then it is determined that charging station 300 is normal, and the charging current is increased. Accordingly, extension of charging time due to an unnecessarily suppressed charging current can be avoided.

Modification of First Embodiment

In the above description, the temperature information about inlet 150 during external charging is transmitted from vehicle 100 to server 200, and the occurrence of abnormal overheat is determined in server 200 to generate the abnormal overheat information (abnormal overheat flag). Alternatively, the occurrence of abnormal overheat may be determined in vehicle 100 based on the temperature of inlet 150, and a result of the determination may be transmitted to server 200.

Figure 8:
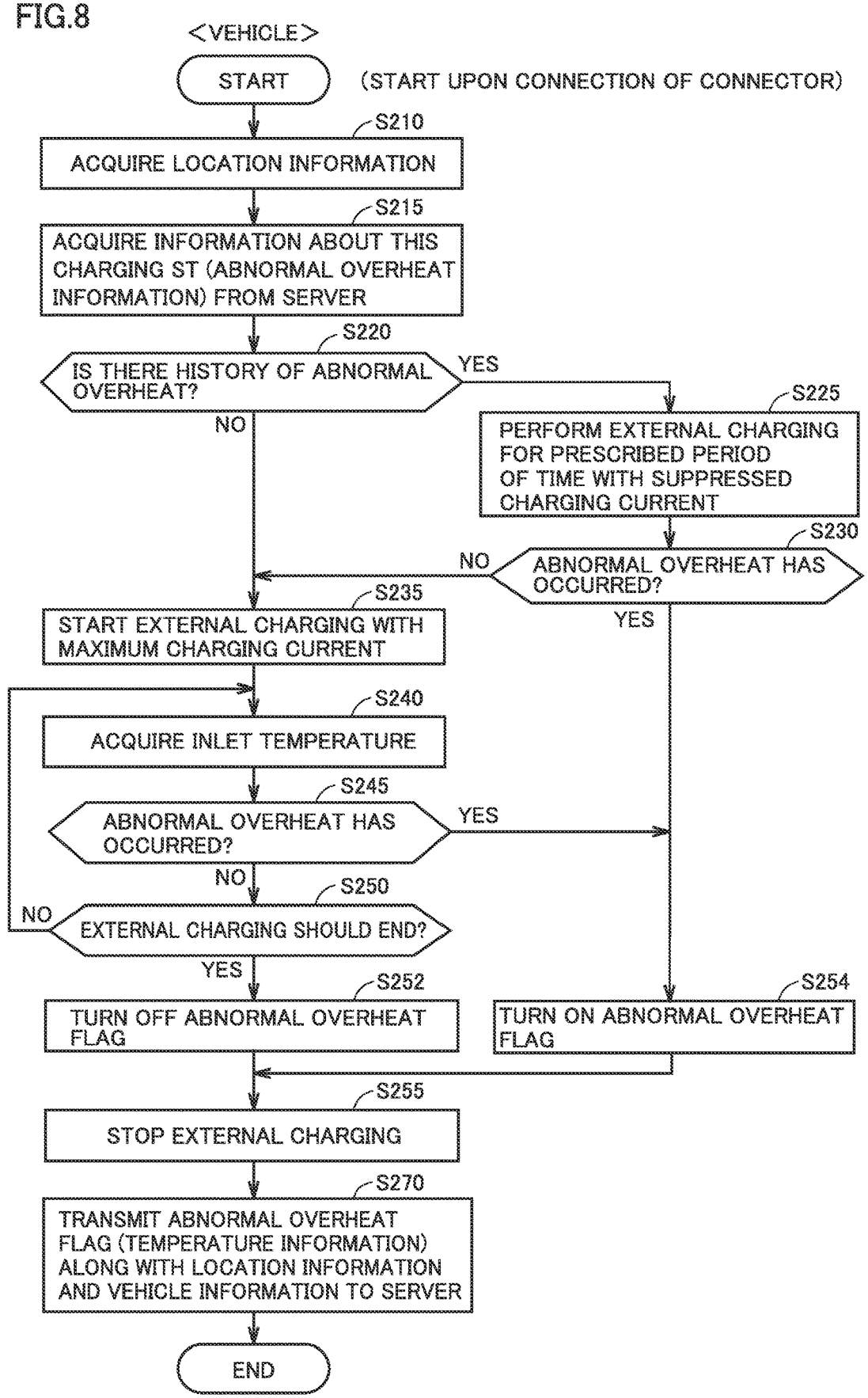
FIG. 8 is a flowchart showing an example procedure of a process performed by the ECU of the vehicle during external charging in a modification of the first embodiment.

FIG. 8 is a flowchart showing an example procedure of a process performed by ECU 160 of vehicle 100 during external charging in this modification. This flowchart corresponds to the flowchart shown in FIG. 4.

Referring to FIG. 8, a process of steps S210 to S240, S250 and S255 is the same as the process of steps S10 to S40, S50 and S55 shown in FIG. 4, respectively. This flowchart further includes steps S245, S252 and S254, and includes step S270 instead of step S60, with respect to the flowchart shown in FIG. 4.

That is, when it is determined in step S230 that abnormal overheat has occurred (YES in step S230), ECU 160 turns on the abnormal overheat flag indicating the occurrence of abnormal overheat (step S254). The process then proceeds to step S255, where the external charging is stopped.

When the temperature of inlet 150 is acquired in step S240, ECU 160 determines, based on the temperature of inlet 150, whether or not abnormal overheat has occurred (step S245). When abnormal overheat has occurred (YES in step S245), the process proceeds to step S254, where the abnormal overheat flag is turned on.

When it is determined in step S245 that abnormal overheat has not occurred (NO in step S245), on the other hand, the process proceeds to step S250, where it is determined whether or not the external charging should end. When it is determined in step S250 that the external charging should end (YES in step S250), ECU 160 turns off the abnormal overheat flag (step S252). The process then proceeds to step S255, where the external charging is stopped.

When the external charging is stopped in step S255, ECU 160 transmits, to server 200, the abnormal overheat flag (temperature information) that has been set in step S252 or S254, along with the location information acquired from GPS receiver 172 and the vehicle information (step S270).

Figure 9:
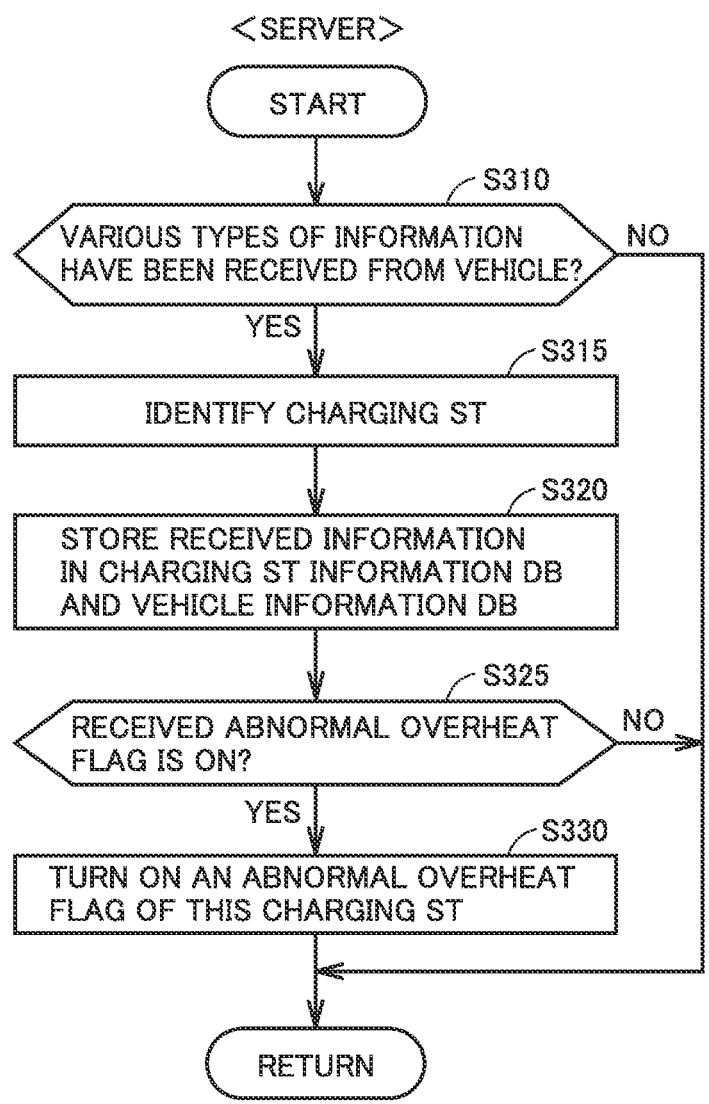
FIG. 9 is a flowchart showing an example procedure of a process performed by the processor of the server in the modification of the first embodiment.

FIG. 9 is a flowchart showing an example procedure of a process performed by processor 230 of server 200 in this modification. This flowchart corresponds to the flowchart shown in FIG. 5.

Referring to FIG. 9, a process of steps S310 to S320, and S330 is the same as the process of steps S110 to S120, and S130 shown in FIG. 5, respectively. This flowchart includes step S325 instead of step S125, with respect to the flowchart shown in FIG. 5.

That is, when the information received from vehicle 100 is stored in charging station information DB 221 and vehicle information DB 222 in step S320, processor 230 of server 200 determines whether or not the abnormal overheat flag received from vehicle 100 is ON (step S325).

When it is determined that the abnormal overheat flag is ON (YES in step S325), the process proceeds to step S330, where the abnormal overheat flag of this charging station in charging station information DB 221 is turned on.

When it is determined in step S325 that the abnormal overheat flag received from vehicle 100 is OFF (NO in step S325), the process proceeds to a return step without step S330 being performed. That is, in this case, the abnormal overheat flag of this charging station in charging station information DB 221 is not updated.

According to this modification, the occurrence of abnormal overheat is determined in vehicle 100, and a result of the determination is transmitted to server 200. Accordingly, the occurrence of abnormal overheat does not need to be determined in server 200 based on the temperature information acquired from vehicle 100, so that a processing load on server 200 can be suppressed.

Second Embodiment

This second embodiment illustrates a configuration capable of determining, when abnormal overheat occurs, whether there is a problem with the connector of the charging station or there is a problem with inlet 150 of vehicle 100.

The configuration of the charging system and the overall configuration of vehicle 100 in this second embodiment are the same as those of the first embodiment.

Figure 10:
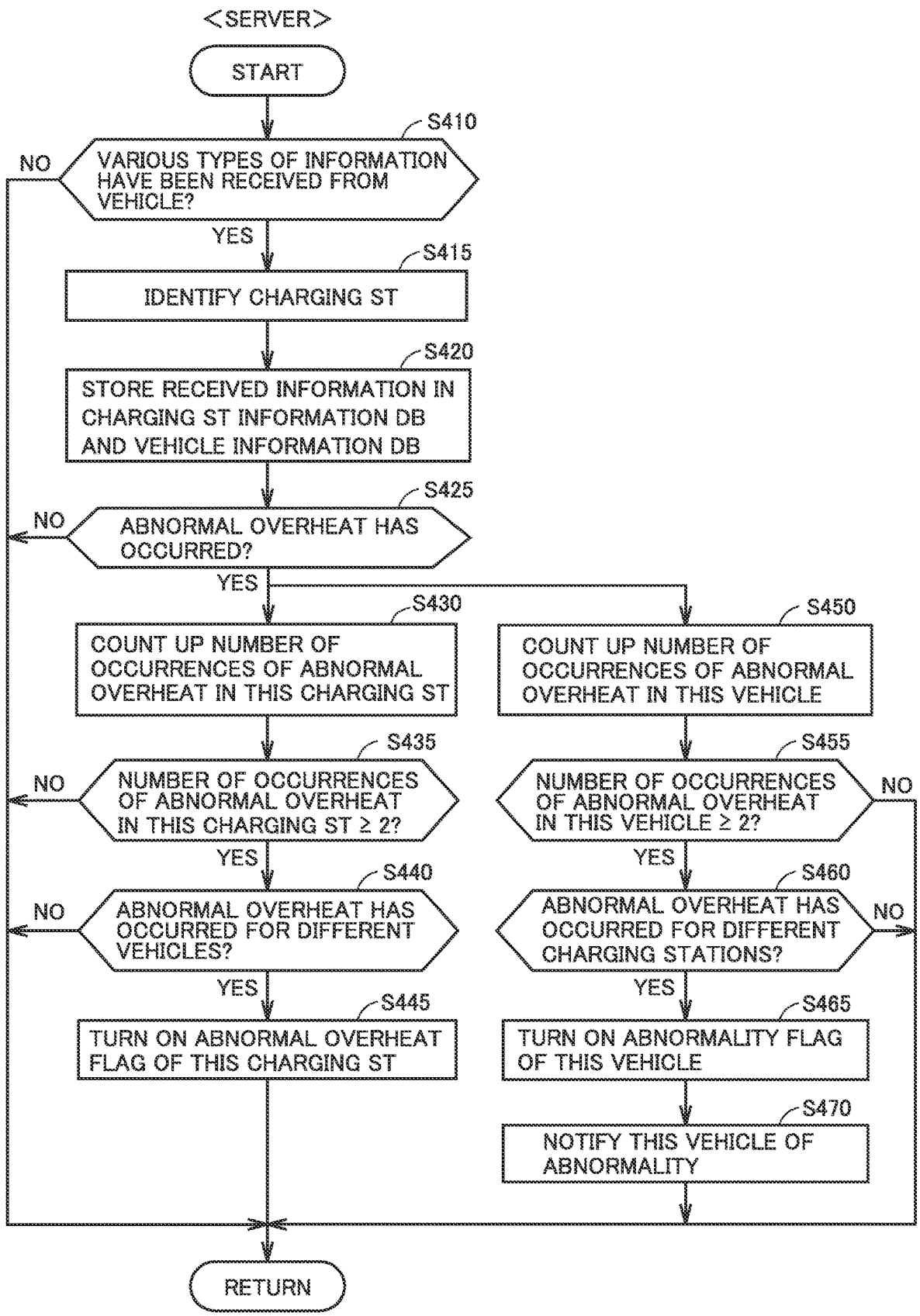
FIG. 10 is a flowchart showing an example procedure of a process performed by the processor of the server in a second embodiment.

FIG. 10 is a flowchart showing an example procedure of a process performed by processor 230 of server 200 in the second embodiment. This flowchart corresponds to the flowchart shown in FIG. 5. A series of process steps shown in this flowchart is also repeated at regular intervals.

Referring to FIG. 10, a process of steps S410 to S425 is the same as the process of steps S110 to S125 shown in FIG. 5, respectively.

When it is determined in step S425 that abnormal overheat has occurred (YES in step S425), processor 230 of server 200 counts up the number of occurrences of abnormal overheat in this charging station (step S430), and also counts up the number of occurrences of abnormal overheat in this vehicle (step S450).

Following the process of step S430, processor 230 determines whether or not the number of occurrences of abnormal overheat in this charging station is two times or more (step S435). That is, it is determined whether or not the abnormal overheat has occurred a plurality of times in this charging station.

When it is determined that the number of occurrences of abnormal overheat is two times or more (YES in step S435), processor 230 determines whether or not the abnormal overheat has occurred for different vehicles in this charging station (step S440).

When it is determined that the abnormal overheat has occurred for different vehicles (YES in step S440), processor 230 turns on the abnormal overheat flag of this charging station (step S445). This abnormal overheat flag is stored in charging station information DB 221 while being associated with information about this charging station.

When it is determined in step S435 that the number of occurrences of abnormal overheat in this charging station is one time (that is, the first time) (NO in step S435), or when it is determined in step S440 that the abnormal overheat has not occurred for different vehicles (that is, the abnormal overheat has occurred for the same vehicle) (NO in step S440), the process proceeds to a return step without step S445 being performed. This is because, in these cases, it cannot be determined that the abnormal overheat has occurred due to a problem with the charging station.

Following the process of step S450, processor 230 determines whether or not the number of occurrences of abnormal overheat in this vehicle is two times or more (step S455). That is, it is determined whether or not the abnormal overheat has occurred a plurality of times in this vehicle.

When it is determined that the number of occurrences of abnormal overheat is two times or more (YES in step S455), processor 230 determines whether or not the abnormal overheat has occurred for different charging stations in this vehicle (step S460).

When it is determined that the abnormal overheat has occurred for different charging stations (YES in step S460), processor 230 turns on an abnormality flag of this vehicle (step S465). This abnormality flag is stored in vehicle information DB 222 while being associated with information about this vehicle. Processor 230 then notifies this vehicle of an abnormality in inlet 150 (step S470).

When it is determined in step S455 that the number of occurrences of abnormal overheat in this vehicle is one time (that is, the first time) (NO in step S455), or when it is determined in step S460 that the abnormal overheat has not occurred for different charging stations (that is, the abnormal overheat has occurred for the same charging station) (NO in step S460), the process proceeds to a return step without steps S465 and S470 being performed. This is because, in these cases, it cannot be determined that the abnormal overheat has occurred due to a problem with the vehicle.

When it is determined in step S425 that abnormal overheat has not occurred (NO in step S425), the process proceeds to a return step without step S425 and the subsequent steps being performed.

FIG. 11 shows a configuration example of data stored in charging station information DB 221 of server 200 in the second embodiment. Referring to FIG. 11, "ID," "LOCATION INFORMATION" and "ABNORMAL OVERHEAT" are as were described with reference to FIG. 6.

"NUMBER OF OVERHEAT" indicates the number of occurrences of abnormal overheat during past external charging occasions in a corresponding charging station. In this example, for example, it is indicated that, with regard to a charging station having an ID of ST002, the number of past charging occasions is N2, of which abnormal overheat has occurred three times. In this second embodiment, when abnormal overheat has occurred for different vehicles in a charging station having this number of overheat of two times or more (that is, a plurality of times), the abnormal overheat flag of this charging station is turned on. In this example, the abnormal overheat flag of the charging station having an ID of ST002 is ON. The abnormal overheat flag of a charging station having an ID of ST003 is OFF, on the other hand, despite a one time occurrence of abnormal overheat in the past.

Then, the abnormal overheat flag (abnormal overheat information) thus set is transmitted to vehicle 100 in response to a request from vehicle 100, before the start of external charging in vehicle 100. In vehicle 100, abnormal overheat has occurred a plurality of times during past external charging occasions, based on the received abnormal overheat information, and for a charging station where the abnormal overheat has occurred for different vehicles (YES in step S20 of FIG. 4), external charging with a suppressed charging current is performed for a prescribed period of time (step S25 of FIG. 4).

FIG. 12 shows a configuration example of data stored in vehicle information DB 222 of server 200 in the second embodiment. Referring to FIG. 12, "ID," "CHARGING ST" and "TEMPERATURE INFORMATION" are as were described with reference to FIG. 6.

"OVERHEAT HISTORY" indicates a history of abnormal overheat of a corresponding charging station, where the circle indicates that there is a history. As an example, it is indicated that, with regard to vehicle 100 having an ID of V001, abnormal overheat has occurred during external charging by the charging station having an ID of ST002.

"NUMBER OF OVERHEAT" indicates the number of occurrences of abnormal overheat during past external charging occasions in corresponding vehicle 100. As an example, it is indicated that, with regard to vehicle 100 having an ID of V003, the number of past external charging occasions is N13, of which abnormal overheat has occurred three times.

"VEHICLE ABNORMALITY" is an abnormality flag indicating whether or not an abnormality has occurred in vehicle 100 (inlet 150), where the circle indicates that the abnormality flag is ON. In this second embodiment, the number of occurrences of abnormal overheat is also counted for each vehicle 100, and when abnormal overheat has occurred for different charging stations in a vehicle having the number of overheat of two times or more (that is, a plurality of times), the abnormality flag of this vehicle is turned on. In this example, the abnormality flag of vehicle 100 having an ID of V003 is ON. The abnormality flag of each of vehicles 100 having IDs of V001 and V002 is OFF, on the other hand, despite a one time occurrence of abnormal overheat in the past.

Then, when this abnormality flag of vehicle 100 to be externally charged is ON, this vehicle is notified of an abnormality (steps S465 and S470 of FIG. 10). The timing of this notification may be, for example, the timing of transmission of the abnormal overheat flag (abnormal overheat information) to vehicle 100 in response to a request from vehicle 100, before the start of external charging.

As described above, in this second embodiment, the number of occurrences of abnormal overheat in each charging station is counted, and when the abnormal overheat has occurred for different vehicles (a plurality of vehicles) in a single charging station, it is indicated that there is a history of abnormal overheat of this charging station. In addition, the number of occurrences of abnormal overheat in each vehicle 100 is also counted, and when the abnormal overheat has occurred for different charging stations (a plurality of charging stations) in single vehicle 100, it is indicated there is an abnormality in this vehicle 100 (inlet 150). In this manner, according to this second embodiment, it can be determined, when abnormal overheat occurs, whether there is a problem with the connector of charging station 300 or there is a problem with inlet 150 of vehicle 100.

Modification of Second Embodiment

Similarly to the modification of the first embodiment, the occurrence of abnormal overheat may be determined in vehicle 100 based on the temperature of inlet 150 and a result of the determination may be transmitted to server 200 in the above-described second embodiment as well.

Figure 13:
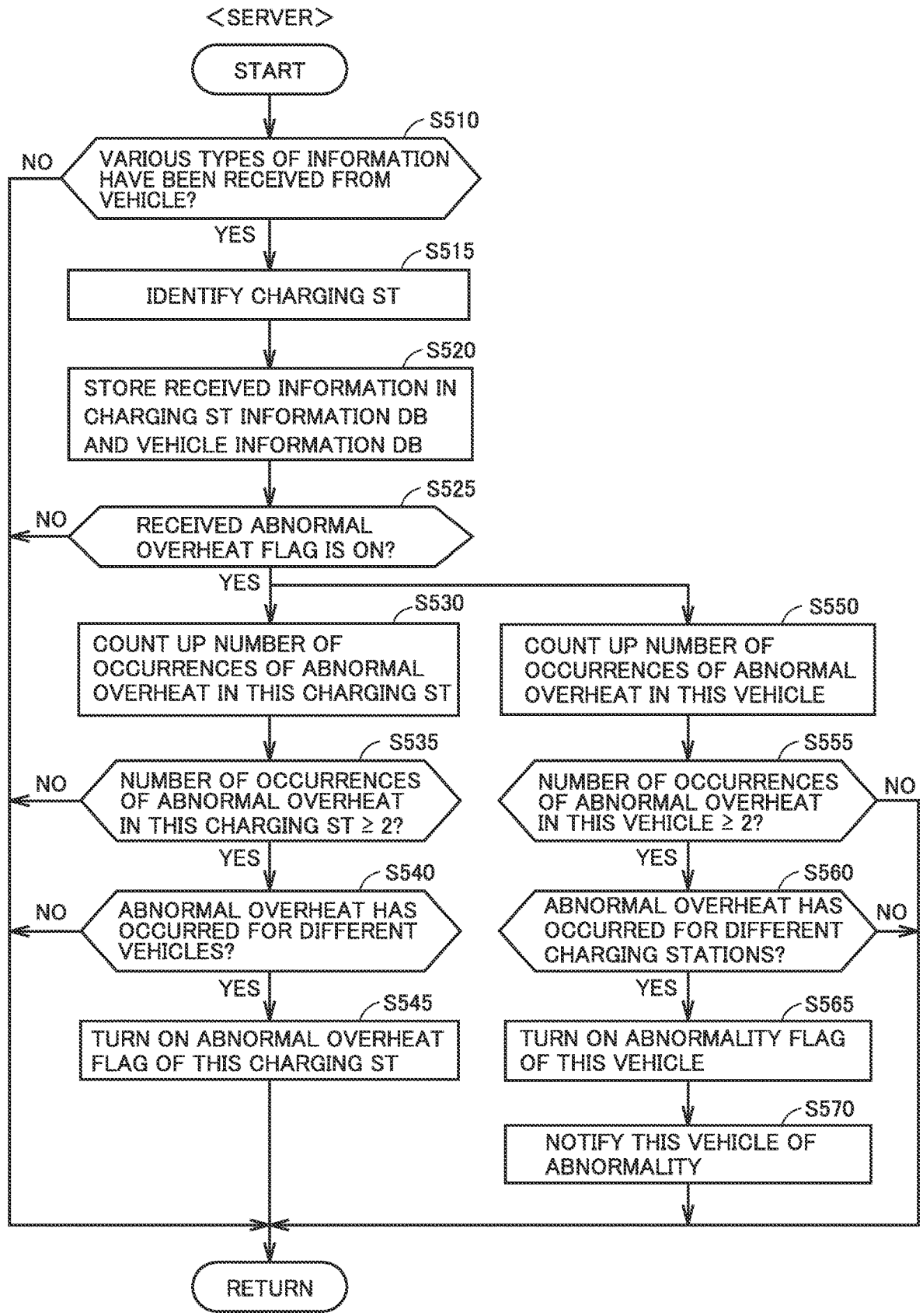
FIG. 13 is a flowchart showing an example procedure of a process performed by the processor of the server in a modification of the second embodiment.

FIG. 13 is a flowchart showing an example procedure of a process performed by processor 230 of server 200 in this modification. This flowchart corresponds to the flowchart shown in FIG. 10.

Referring to FIG. 13, a process of steps S510 to S520, and S530 and S570 is the same as the process of steps S410 to S420, and S430 and S470 shown in FIG. 10, respectively. This flowchart includes step S525 instead of step S425, with respect to the flowchart shown in FIG. 10.

That is, when the information received from vehicle 100 is stored in charging station information DB 221 and vehicle information DB 222 in step S520, processor 230 of server 200 determines whether or not the abnormal overheat flag received from vehicle 100 is ON (step S525).

When it is determined that the received abnormal overheat flag is ON (YES in step S525), the number of occurrences of abnormal overheat in this charging station is counted up in step S530, and the number of occurrences of abnormal overheat in this vehicle is also counted up in step S550.

As described above, according to this modification, too, the occurrence of abnormal overheat does not need to be determined in server 200 based on the temperature information acquired from vehicle 100, so that a processing load on server 200 can be suppressed.

Other Modifications

In the second embodiment and its modification described above, when abnormal overheat has occurred a plurality of times in a single charging station, and the abnormal overheat has occurred for different vehicles, then the abnormal overheat flag of this charging station is turned on. Alternatively, a condition for determining the occurrence of abnormal overheat may be limited to the most recent predetermined number of external charging occasions. For example, when abnormal overheat has occurred a plurality of times in a single charging station during the most recent predetermined number of external charging occasions, and the abnormal overheat has occurred for different vehicles, then the abnormal overheat flag of this charging station may be turned on.

Alternatively, when the occurrence frequency of abnormal overheat exceeds a prescribed ratio (for example, 50%) during the most recent predetermined number of external charging occasions, and the abnormal overheat has occurred for different vehicles, then the abnormal overheat flag of this charging station may be turned on.

Although DC charging (external charging) is performed by charging station 300 in the embodiments and their modifications described above, vehicle 100 according to the present disclosure may perform AC (Alternate Current) charging (external charging) by an AC charging station. In this case, vehicle 100 is equipped with a power conversion device for converting AC power input through inlet 150 into DC power.

Although the present disclosure has been described and illustrated in detail, it is clearly understood that the same is by way of illustration and example only and is not to be taken by way of limitation, the scope of the present disclosure being interpreted by the terms of the appended claims.

What is claimed is:

1. A vehicle configured to perform external charging in which a vehicle-mounted power storage device is charged by a charging facility provided outside of the vehicle, the vehicle comprising:
    a power receiving inlet connectable to a connector of the charging facility during the external charging;
    a communication device configured to communicate with a server provided outside of the vehicle; and
    a controller configured to perform a first process of transmitting first information to the server through the communication device, and perform a second process by acquiring second information from the server through the communication device,
    the first information including temperature information about a temperature of the power receiving inlet during the external charging, and information for identifying the charging facility having the connector connected to the power receiving inlet,
    the second process including a process of controlling the external charging based on the second information acquired before a start of the external charging,
    the second information including abnormal overheat information about the charging facility connected to the power receiving inlet, the abnormal overheat information indicating a history of abnormal overheat at the power receiving inlet connected to the connector during past external charging, and
    occurrence of the abnormal overheat being determined based on the temperature of the power receiving inlet during the external charging.

2. The vehicle according to claim 1, wherein
    the second process includes a process of starting, when the abnormal overheat information indicates that there is a history of the abnormal overheat, the external charging with a suppressed charging current, as compared to when the abnormal overheat information indicates that there is no history of the abnormal overheat.

3. The vehicle according to claim 2, wherein
    the second process further includes a process of increasing, when the abnormal overheat at the power receiving inlet does not occur after the external charging is started with the suppressed charging current, the charging current more than that at the start of the external charging.

4. The vehicle according to claim 1, wherein
    the controller is configured to determine occurrence of the abnormal overheat based on the temperature of the power receiving inlet during the external charging, and
    the temperature information includes information of the abnormal overheat.

5. A charging system comprising:
    a plurality of vehicles, each configured to perform external charging in which a vehicle-mounted power storage device is charged by a charging facility provided outside of the vehicle; and
    a server configured to communicate with the plurality of vehicles,
    each of the plurality of vehicles including
        a power receiving inlet connectable to a connector of the charging facility during the external charging,
        a communication device configured to communicate with the server, and
        a controller configured to perform a first process of transmitting first information to the server through the communication device, and perform a second process by acquiring second information from the server through the communication device,
    the first information including temperature information about a temperature of the power receiving inlet during the external charging, and information for identifying the charging facility having the connector connected to the power receiving inlet,
    the second process including a process of controlling the external charging based on the second information acquired before a start of the external charging,
    the second information including abnormal overheat information about the charging facility connected to the power receiving inlet, the abnormal overheat information indicating a history of abnormal overheat at the power receiving inlet connected to the connector during past external charging, and
    occurrence of the abnormal overheat being determined based on the temperature of the power receiving inlet during the external charging.

6. The charging system according to claim 5, wherein
    the second process includes a process of starting, when the abnormal overheat information indicates that there is a history of the abnormal overheat, the external charging with a suppressed charging current, as compared to when the abnormal overheat information indicates that there is no history of the abnormal overheat.

7. The charging system according to claim 6, wherein
    the second process further includes a process of increasing, when the abnormal overheat at the power receiving inlet does not occur after the external charging is started with the suppressed charging current, the charging current more than that at the start of the external charging.

8. The charging system according to claim 5, wherein
    the server is configured to
        generate the abnormal overheat information based on the first information collected from the plurality of vehicles, and
        when the abnormal overheat has occurred for different vehicles of the plurality of vehicles, cause the abnormal overheat information about the charging facility connected to the power receiving inlet to indicate that there is a history of the abnormal overheat.

9. The charging system according to claim 5, wherein
the temperature information includes the temperature of the power receiving inlet during the external charging, and
the server is configured to determine occurrence of the abnormal overheat based on the temperature information.

10. The charging system according to claim 5, wherein
the controller is configured to determine occurrence of the abnormal overheat based on the temperature of the power receiving inlet during the external charging, and
the temperature information includes a result of the determination of presence or absence the abnormal overheat.

\* \* \* \* \*